US012007095B1

(12) United States Patent
Mueller

(10) Patent No.: US 12,007,095 B1
(45) Date of Patent: Jun. 11, 2024

(54) POWERED ILLUMINATION STRIPS

(71) Applicant: Thomas Mueller, Las Vegas, NV (US)

(72) Inventor: Thomas Mueller, Las Vegas, NV (US)

( * ) Notice: Subject to any disclaimer, the term of this patent is extended or adjusted under 35 U.S.C. 154(b) by 0 days.

(21) Appl. No.: 18/375,510

(22) Filed: Sep. 30, 2023

Related U.S. Application Data

(60) Provisional application No. 63/417,316, filed on Oct. 18, 2022, provisional application No. 63/393,910, filed on Jul. 30, 2022.

(51) Int. Cl.

| | |
|---|---|
| ***F21V 33/00*** | (2006.01) |
| ***F21S 4/24*** | (2016.01) |
| ***F21S 9/03*** | (2006.01) |
| ***F21V 21/08*** | (2006.01) |
| ***G08B 7/06*** | (2006.01) |
| ***G08B 21/02*** | (2006.01) |
| *F21Y 103/10* | (2016.01) |
| *F21Y 115/10* | (2016.01) |

(52) U.S. Cl.
CPC ................. *F21S 9/032* (2013.01); *F21S 4/24* (2016.01); *F21V 21/0832* (2013.01); *F21V 33/0008* (2013.01); *G08B 7/06* (2013.01); *G08B 21/028* (2013.01); *F21Y 2103/10* (2016.08); *F21Y 2115/10* (2016.08)

(58) Field of Classification Search
CPC .... F21S 9/03; F21S 9/032; F21S 9/035; F21S 9/037; F21S 4/20; F21S 4/22; F21S 4/24; F21S 4/26; F21V 33/0008
See application file for complete search history.

(56) References Cited

U.S. PATENT DOCUMENTS

| | | | | |
|---|---|---|---|---|
| 11,178,922 | B1 * | 11/2021 | Allen | F21V 33/0076 |
| 2019/0161926 | A1 * | 5/2019 | Wiesen | F21S 9/03 |
| 2022/0373143 | A1 * | 11/2022 | Wu | F21S 2/005 |

* cited by examiner

*Primary Examiner* — Sean P Gramling
(74) *Attorney, Agent, or Firm* — Newman Law, LLC

(57) ABSTRACT

Illumination systems or strips which include one or more lights, such as LED lights, connected with a rechargeable battery, such as through copper or aluminum wiring, and a solar panel for recharging a rechargeable battery during sufficiently high-light ambient conditions, thus enabling the rechargeable battery to provide power for the illumination system during low-light ambient conditions.

3 Claims, 3 Drawing Sheets

POWERED ILLUMINATION STRIPS

BACKGROUND OF THE INVENTION

Field of the Invention

The present invention relates to illumination systems which use battery or solar power as a power source, which may be formed as or with strips that can be attached to, incorporated with or embedded in, any item, including articles of clothing that can be worn or attached to the body.

Description of the Related Art

Many outdoor activities, recreational and vocational, increase in danger solely due to the lack of visibility during nighttime or even in some daytime conditions. Motorcycles and motorized vehicles are all equipped with battery-powered lights which, when illuminated, make them easier to detect at night or in such conditions. Bicycles also generally have battery-powered lights which can be used to increase the likelihood of they will be detected by others in low-light conditions. These battery-powered illumination systems may be intended for use on motorcycles, vehicles and bicycles, but none of these illumination systems are intended for use by individuals engaging in outdoor activities independently from a motorcycle, vehicle or bicycle. Accordingly, it is desirable to provide illumination systems which can be easily adopted for use by individuals.

SUMMARY OF THE INVENTION

The invention is generally directed to illumination systems which include one or more lights connected with a rechargeable battery, and in some embodiments, a solar panel for recharging the rechargeable battery during sufficiently high-light ambient conditions, thus enabling the rechargeable battery to provide power as needed.

In some embodiments, the invention is directed to an illumination system composed of an elongated substrate, or strip, which supports various light-emitting diodes (LEDs) thereon. The LEDs may be singular or multi-colored, such as red, amber, green, blue and white.

In some embodiments, the LEDs may be activated for constant illumination, intermittently or in a pattern. In other words, the LEDs may flash, zip, waver or steady burn. In some embodiments, one or more configurations are used to indicate when batteries need to be charged or changed. For example, a solar panel charges the batteries in 3-5 hours and will flash for 48 hours on one charge. They will go to steady burn for 10 hours to notify the batteries need to be charged). In some embodiments, the substrate or strip may be recharged wirelessly or includes a USB port for recharging the battery.

In some embodiments, the strip may include a housing for supporting electrical components and being in electrical communication with the LEDs on the strip. The electrical components include the LED controls and/or the rechargeable battery. The housing may further include a solar panel mounted thereon for charging the batteries.

In some embodiments, the housing or control box may be positioned such that the solar panel receives light and converts the light received into electricity, and directs the electricity for recharging a rechargeable battery maintained in the housing for storing electrical energy. The housing may therefore include a first set of flexible conductors in electrical communication with an output terminal of the solar panel on a first end and the battery on the second end, one or more lights, a second set of flexible conductors in electrical communication with the battery on a first end and the one or more lights on a second end, and an electrical switch for alternately connecting and disconnecting an electrical circuit including the battery and the one or more lights, wherein the lights illuminate responsive to the electrical circuit being connected by the electrical switch. The housing may include a circuit board and additional switches with program controls for color and patterns, such as wave, steady, slow change and flashing the lights.

In some embodiments, the control box further includes an actuatable portion, such as a touchscreen or a physical depressible button, which is configured to contact help, such as by contacting or calling an emergency services number through a satellite or Bluetooth type connection with the user's mobile device, and/or by causing all lights to signal for help, such as by flashing all lights brightly.

In some embodiments, the rechargeable battery is one of a Li-battery, nickel-metal hydride battery, nickel-cadmium battery.

In some embodiments, the housing further includes a port for connecting to an outlet or other device, such as a port for forming a USB connection. In some embodiments, the USB connection may be used to connect with a power source or mobile device for communication and electrical charging of the rechargeable battery, or the battery may be charged by other similar connectors or wireless connection.

In some embodiments, the housing is waterproof and/or includes attachment mechanisms for being secured to another item or body, such as to a garment, a hat, a post or directly on a user.

In some embodiments, the wearable article is a garment. The garment may be configured to be worn on the upper body of a human, with the solar panel being positioned on an area of the garment associated with the shoulder of a wearer of the garment. The one or more lights may be mounted in an area of the garment associated with the torso of the wearer of the garment. Additionally, the one or more lights are mounted on the garment in the form of a symbol, such as an arrow, stop or caution signs or symbols, or spell out a word, such a stop or help.

In some embodiments, the one or more lights are configured to illuminate intermittently.

In some embodiments, the illumination system further includes an ambient light sensor for alternately activating and deactivating the one or more lights responsive to detecting ambient light conditions.

In some embodiments, the illumination system further comprises a communication device mounted in the housing, the communication device forming a communication connection with a mobile device.

In some embodiments, the illumination system further comprises an emergency actuator switch mounted on the housing, wherein upon being actuated, the emergency actuator is configured to: (i) cause the switch to alternate to the connected position; and (ii) cause the communication device to send a communication to the mobile device, wherein the communication to the mobile device causes the mobile device to contact an emergency services number.

In some embodiments, the elongated strips are configured to include a first strip dimensioned and configured to encircling the waist of a human torso and at least one elongated strip having opposing ends, wherein the elongated strip is configured and dimensioned to extend from the waist, over the shoulder and back area, and the opposing ends of the elongated strip are connected to the first strip encircling the waist. The first strip may be divided into a front portion and a rear portion, wherein one of the opposing ends of the elongated strip is connected to the front portion and the other one of the opposing ends is connected to the rear portion, and the front portion and the rear portion include engagements, such as hook and latch or male and female connecting parts, for forming a non-permanent engagement between the front portion and the rear portion.

In some embodiments, the elongated strips of material described above comprise: a first strip dimensioned and configured to encircling the waist area of a human torso; and at least one elongated strip having opposing ends connected to the first strip, wherein the at least one elongated strip is configured and dimensioned to extend from a first location on the first strip, over the shoulder and back area of the human torso to a second location on the first strip.

In some embodiments, the first strip is divided into a front portion and a rear portion, wherein the first location is on the front portion and the second location is on the rear portion.

In some embodiments, the illumination system further comprises corresponding engagement members on the front portion and the rear portion configured to form a non-permanent engagement between the front portion and the rear portion.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENT

Various embodiments are enabled by the invention, including but not limited to the embodiments described herein. In the following description, numerous specific examples and details are set forth in order to provide a more thorough description of the invention. Thus, it will be apparent to one skilled in the art, that the invention may be practiced without at least some of the specific details provided herein. In other instances, well-known features have not been described in detail so as not to obscure the invention.

Figure 1:
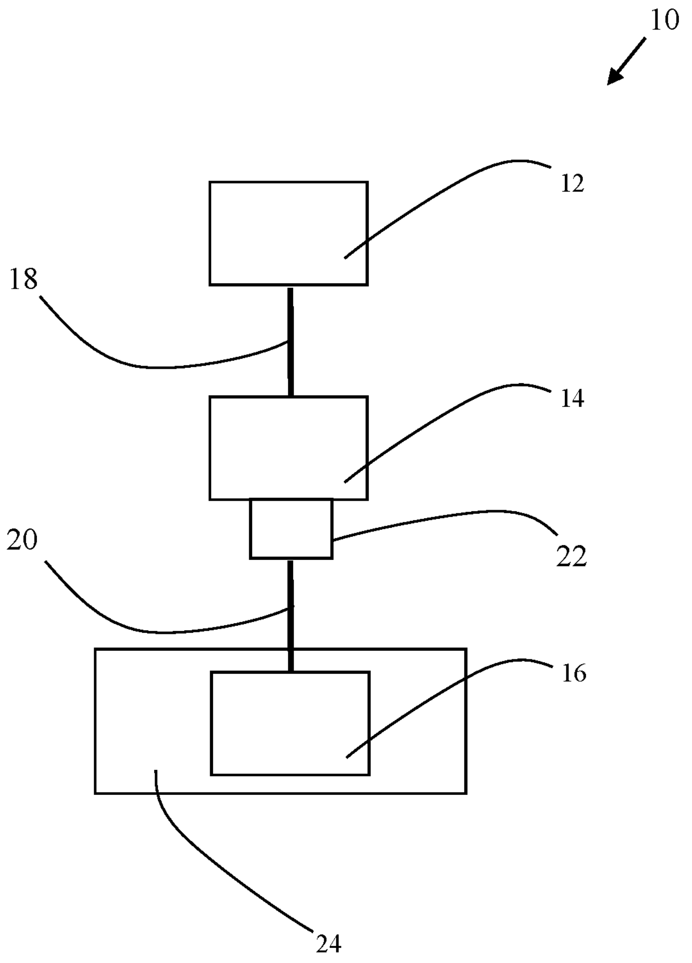
FIG. 1 is a schematic diagram of a system constructed in accordance with the invention.

An illumination system constructed and configured in accordance with the invention is shown in FIG. 1 and generally referred to by the reference number 10. Illumination system 10 includes a solar panel 12, a rechargeable battery 14 and a light 16 connected by electrical conductors 18 and 20, respectively, to form an electrical circuit.

System 10 of this embodiment further includes a switch 22 for alternately connecting and disconnecting the electrical circuit resulting in the corresponding activation and deactivation of light 16. Switch 22 may be mounted on or adjacent to battery 14.

In some embodiments, switch 22 is manually switched between connected and disconnected states whereas in other embodiments switch 22 is an ambient light detector configured to automatically switch to the connected state based on a detection of low ambient light conditions.

It should be understood that electrical conductors 18 and 20 may be constructed of any electrically conductive material, such as copper, but may also be made of aluminum, and may be cylindrical or flat.

Rechargeable battery 14 may be any power storage or capacitor, and may be a lithium battery, nickel-metal hydride battery or nickel-cadmium battery. It should be understood that system 10 may further include duplicate components, such as more than one solar panel 12 and more than one battery 14.

In this embodiment, lights 16 are disposed on a substrate 24. Substrate 24 may be made of a rigid or flexible material. In some embodiments, substrate 24 includes a fastener, such as an adhesive strip, hook-and-loop fastener, touch fastener, fastener or other closure for temporarily or permanently fastening substrate 24 to another article or body. For example, the body can be the upper body, such as torso, or lower body, such as the legs or ankles, and articles can be hats or clothing, such as wristbands, shirts, pants, footwear, headwear, etc.

In some embodiments, battery 14 is configured to power lights 16 such that lights 16 blink intermittently. When battery 14 is drained below a threshold potential energy level lights 16 cease blinking and remain steady as an indicator that battery 14 is low until eventually turning off due to a lack of battery power from battery 14.

Figure 2:
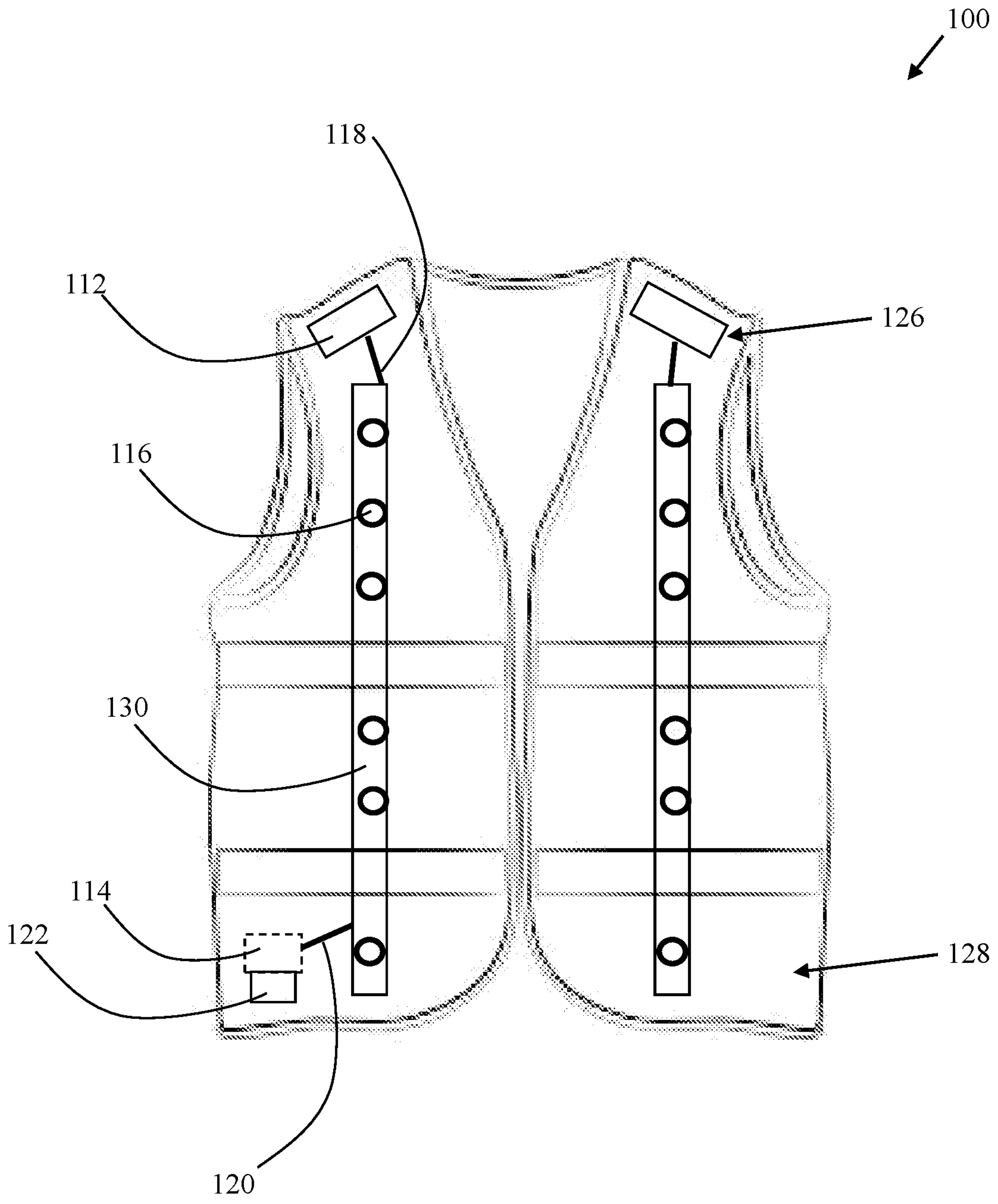
FIG. 2 is a front view of an article incorporating another embodiment of the system of the invention.

FIG. 2 illustrates an article 100 constructed to include an illumination system 110. Article 100 is intended to be worn as a vest for safety and can be constructed of any material, such as a polyester, nylon, vinyl, cotton, or combinations thereof, and may particularly be made of or otherwise include brightly colored neon and reflective materials. It should be understood that article 100 is not limited to a vest and the invention is applicable to any of a variety of other forms as well.

Article 100 includes a partially exposed solar panel 112 mounted in the shoulder area of article 100, that is, in an upper area 126 which would normally rest upon the shoulder of a user of article 100. Solar panel 112 is electrically connected with battery 114 which is mounted on article 100. Battery 114 may be mounted anywhere on article 100 but in this embodiment is mounted in a lower area 128 of article 100 that would rest upon the waist of the user. Lights 116 are mounted along an elongated strip 130 generally extending from the lower area 128 to the upper area 126. Electrical conductors 118 and 120 (partially shown) extend from lower area 128 to upper area 126 to form an electrical circuit which is connected for electrical flow responsive to switch 122 being switched to the on position by the user.

Lights 116 may be a series of light emitting diodes (LEDs) mounted on strip 130 of any color or colors to provide for high brightness illumination.

In some embodiments, lights 116 may include multiple sets of lights or LEDs, which may also be symmetrically arranged on article 100 or arranged to form a symbol or word on article 100 to use system 110 to send a signal or message via lights 116. This may be particularly useful in low light conditions and/or noisy conditions in which visual messages provided by lights 116 may be easier to convey than vocal messages. Lights 116 on article 100 may be visible from much farther away than article 100 without lights, even if article 100 includes reflective material.

When illumination is not necessary, such as during the day, switch 122 is switched to the off position to disconnect the electrical circuit so that no electricity is received by lights 116. However, switch 122 is not configured to connect or disconnect the electrical connection between solar panel 112 and battery 114. During the day when switch 122 is in the off position, electrical energy generated by solar panel 112 is therefore directed to and stored in rechargeable battery 114. When illumination of lights 116 is necessary, such as during night, switch 122 is switched to the on position to connect the circuit formed by electrical connectors 120, thereby causing the lights 116 to receive power from battery 114 and emit light.

According to the present invention, system 10 and article 100 provides for protection and safety to an individual engaging in outdoor activity during low-light conditions. This can be the difference between life and death in certain occupations such as highway construction which often takes place at night during which individuals work immediately adjacent to vehicles moving at high rates of speed.

Further, the system 10 consumes solar power as the power source for the light. Solar power is a pure, safe and free natural resource, and its supply is unlimited and its utilization is endless, particularly in southwestern parts of the United States. Therefore, utilization of solar power is economic and environmentally friendly.

Figure 3:
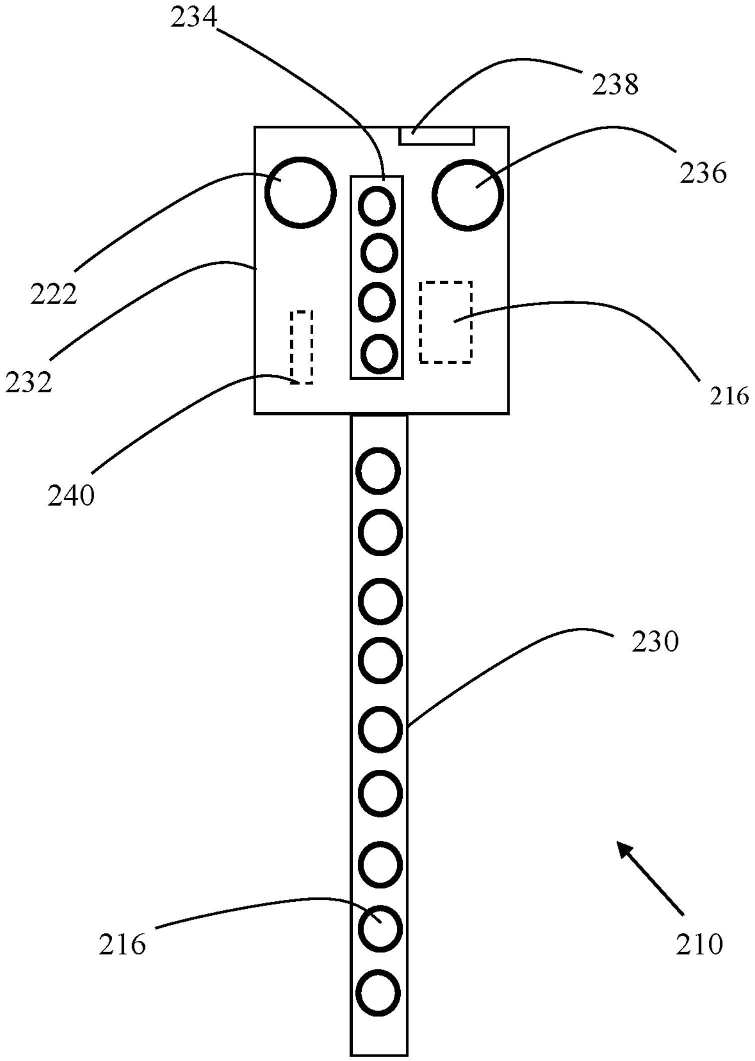
FIG. 3 is schematic diagram of another embodiment of a system constructed in accordance with the invention.

Another embodiment of an illumination system constructed and configured in accordance with the invention is shown in FIG. 3 and generally referred to by the reference number 210. Illumination system 210 includes a housing 232 with a rechargeable battery 214 and an elongated light strip 230 connected to housing 232 and in electrical communication with battery 214 by electrical conductors (not shown) to form an electrical circuit for supplying electricity to lights 216 on light strip 230. Light strip 230 may be constructed of a rigid or flexible material. Housing 232 further includes a button 222 mounted thereon for activating lights 216 by alternately connecting and disconnecting the electrical circuit resulting in the corresponding activation and deactivation of lights 216. Button 222 may also control the patterns and colors displayed by lights 216. Housing 232 may further include a status light array 234 which indicates the amount of power remaining in battery 214 by one or both of the number of lights in the array 234 illuminated or their respective color. In some embodiments, array 234 or another light mounted to housing 232, may be activated to function as a spotlight. An emergency help button 236 is mounted on housing 232 which upon being actuated, will contact emergency services or signal a connected mobile device to contact emergency services for help while also activating all lights, including array 234 and lights 216, in case of emergency. A port 238, such as a USB or other connector, is included in housing 232 and connected with battery 214 to enable charging battery 214 and in communication with a memory (not shown) and/or processor (not shown) to enable programming or adding data to memory. A communication device 240, such as a Bluetooth device, may also be included in housing 232 to facilitate a connection with a user's mobile device which may then be used to contact an emergency number. In some embodiments, the user downloads and installs a software application to facilitate the emergency services contact feature, whereby a user pressing button 236 signals the software application on the user's mobile device to call an emergency services number such as "911." Housing 232 may further include mechanisms for the non-permanent mounting of system 210, such as a clip for attaching to a user's clothing.

The systems of the invention are adapted for installation and use on a number of wearable articles, such as, headwear (e.g., construction helmets, mining helmets, motorcycle helmets, biking helmets, baseball caps, cloth caps, hoods), outwear (coats, jackets, vests, breakaway vests), footwear (boots, shoes), and sporting wear (uniforms, belts), as well as for pets (dog collars for example), among other things. It is envisioned that systems of the invention may be utilized by any individual as well as in connection with vocation or employment. For example, it is envisioned that systems of the invention might be particularly useful for construction, private security, law enforcement, military and homeland security personnel. In some embodiments, the systems of the invention may include additional components, such as for example, two-way communications devices, Bluetooth devices, WiFi devices, geolocating or tracking devices, RFID tags, or GPS navigational systems and devices, some or all of which may be connected to the rechargeable battery, such as battery 14 or 114, or a separate independent power source.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the disclosure of the invention herein and as set forth in the claims and equivalents thereto.

The invention claimed is:

1. An illumination system, comprising:

a housing;

an elongated substrate connected to the housing, wherein the substrate is composed of a strip of flexible material;

a fastener disposed on the elongated substrate, wherein the fastener is configured to fasten the elongated substrate to one of an article or body;

a solar panel mounted on the surface of the housing such that at least a portion thereof is exposed to ambient conditions, the solar panel being adapted to convert solar energy into electric energy;

a rechargeable battery stored in the housing and configured to receive electrical energy outputted from the solar panel mounted to the housing;

one or more lights mounted to the elongated substrate;

a switch mounted on the housing and adapted to alternate between a connected position and a disconnected position;

a plurality of conductors in electrical communication with the solar panel, rechargeable battery, the one or more lights and the switch, wherein the conductors form an electrical circuit responsive to the switch being in the connected position;

a communication device mounted in the housing, the communication device forming a communication connection with a mobile device; and an emergency actuator switch mounted on the housing, wherein upon being actuated, the emergency actuator is configured to: (i) cause the switch to alternate to the connected position; and (ii) cause the communication device to send a communication to the mobile device, wherein the communication to the mobile device causes the mobile device to contact an emergency services number; wherein the housing is configured for attaching to a user's clothing or other wearable articles.

2. The illumination system as recited in claim 1, wherein the rechargeable battery is one of a Li-battery, nickel-metal hydride battery, nickel-cadmium battery.

3. The illumination system as recited in claim 1, further comprising a second fastener for forming a non-permanent connection of the housing with another item.

* * * * *